(12) United States Patent
Levin et al.

(10) Patent No.: US 9,130,743 B2
(45) Date of Patent: Sep. 8, 2015

(54) METHOD AND APPARATUS FOR COMMUNICATING BETWEEN LOW MESSAGE RATE WIRELESS DEVICES AND USERS VIA MONITORING, CONTROL AND INFORMATION SYSTEMS

(75) Inventors: Gregg B. Levin, Menlo Park, CA (US); Ian L. Sayers, Redwood City, CA (US)

(73) Assignee: PYXIM WIRELESS, INC., Menlo Park, CA (US)

( * ) Notice: Subject to any disclaimer, the term of this patent is extended or adjusted under 35 U.S.C. 154(b) by 58 days.

(21) Appl. No.: 13/528,630

(22) Filed: Jun. 20, 2012

(65) Prior Publication Data

US 2012/0331296 A1 Dec. 27, 2012

Related U.S. Application Data

(60) Provisional application No. 61/499,391, filed on Jun. 21, 2011.

(51) Int. Cl.
*H04W 4/00* (2009.01)
*H04L 9/08* (2006.01)

(52) U.S. Cl.
CPC ............. *H04L 9/0825* (2013.01); *H04W 4/005* (2013.01); *H04L 2209/805* (2013.01)

(58) Field of Classification Search
CPC ..... H04W 4/003; H04W 4/008; H04W 4/025; H04W 4/06; H04W 12/04; H04W 12/06; H04W 88/08; H04W 88/16; H04L 9/0825; H04L 2209/805
USPC ............................ 380/270; 713/170; 370/311
See application file for complete search history.

(56) References Cited

U.S. PATENT DOCUMENTS

| | | | |
|---|---|---|---|
| 4,398,289 A | 8/1983 | Schoute | |
| 4,497,978 A * | 2/1985 | Schoute et al. | 379/279 |
| 4,809,318 A * | 2/1989 | Schoute | 379/279 |
| 5,390,176 A * | 2/1995 | Schoute et al. | 370/395.7 |
| 2002/0012349 A1* | 1/2002 | Schoute | 370/394 |
| 2003/0169761 A1* | 9/2003 | Duncan et al. | 370/449 |
| 2008/0114694 A1* | 5/2008 | Hamdane et al. | 705/59 |
| 2012/0158886 A1* | 6/2012 | O'Connell et al. | 709/217 |
| 2012/0173746 A1* | 7/2012 | Salinger et al. | 709/230 |

(Continued)

OTHER PUBLICATIONS

Lam et al., "Packet Switching in a Multiaccess Broadcast Channel: Dynamic Control Procedures", IEEE Transactions on Communications, vol. COM-23, No. 9, Sep. 1975, pp. 891-904.*

(Continued)

*Primary Examiner* — Kambiz Zand
*Assistant Examiner* — Tongoc Tran
(74) *Attorney, Agent, or Firm* — Kang S. Lim

(57) ABSTRACT

The present invention relates to a method and apparatus for the communicating between remote devices using a low message rate wireless connection via monitoring, control and information systems. The network described in this invention is capable of supporting billions of such devices in an efficient and cost effective manner. The network uses a very low signaling rate and centrally controlled architecture in order to achieve this efficiency. The network can easily support numerous applications each controlling large numbers of devices. As the complexity of protocol used in the network is very much reduced in comparison to existing hierarchical mobile wireless networks, it is possible to produce devices that use very little energy allowing their use in many new and novel applications.

22 Claims, 11 Drawing Sheets

Low Signaling Rate Network Architecture

(56) References Cited

U.S. PATENT DOCUMENTS

| | | | | |
|---|---|---|---|---|
| 2012/0243686 | A1* | 9/2012 | Wesby | 380/270 |
| 2013/0007456 | A1* | 1/2013 | Dean et al. | 713/171 |
| 2013/0010768 | A1* | 1/2013 | Lee et al. | 370/336 |
| 2013/0109375 | A1* | 5/2013 | Zeiler et al. | 455/426.1 |
| 2013/0178217 | A1* | 7/2013 | Keevill et al. | 455/446 |
| 2013/0183924 | A1* | 7/2013 | Saigh et al. | 455/404.2 |
| 2013/0196704 | A1* | 8/2013 | Jain et al. | 455/518 |
| 2013/0203376 | A1* | 8/2013 | Maier et al. | 455/404.2 |
| 2013/0204943 | A1* | 8/2013 | Ricci | 709/204 |
| 2013/0244614 | A1* | 9/2013 | Santamaria et al. | 455/411 |
| 2013/0308779 | A1* | 11/2013 | Little | 380/270 |
| 2014/0229597 | A1* | 8/2014 | O'Connell et al. | 709/223 |

OTHER PUBLICATIONS

Kleinrock et al., "An Optimal Adaptive Scheme for Multiple Access Broadcast Communication", Conference Record 1978, International Conference on Communication, vol. 1, pp. 7.2.1-7.2.5.*

Kleinrock et al., "Packet Switching in a Multiaccess Broadcast Channel: Performance Evaluation", IEEE Transactions on Communications, vol. COM-23, No. 4, Apr. 1975, pp. 410-423.*

DeClerck, Challenges Implementing a Persistent IP Connection, Motorola Mobility, IWPC, Seattle, WA, Nov. 2010, 9 pages.

IEEE Std. 1363-2000, IEEE Standard Specifications for Public-Key Cryptography, 13 pages.

J. Katz et al., Introduction to Modern Cryptography, CRC Press, ISBN, 1-58488-551-3, 2007, 61 pages.

Kleinrock et al, Packet Switching in a Multiaccess Broadcast Channel: Performance Evaluation, IEEE Transactions on Communication, vol. Com-23, No. 4, Apr. 1975, 14 pages.

Kynaslahti, Smart Networks for SmartPhones, Nokia Siemens Networks, IWPC Seattle, Nov. 2010, 27 pages.

Abramson, The Aloha Final Technical Report, Advanced Research Projects Agency, Contract No. NAS2-6700, Oct. 11, 1974, 51 pages.

The Register, http://www.theregister.co.uk/2010/10/08/smartphone_signalling/, Operators Demand Smartphone Sort Signalling Storm, 4 pages.

Schwartz, Mobile Wireless Communications, Cambridge Univ. Press, 2005, 51 pages.

* cited by examiner

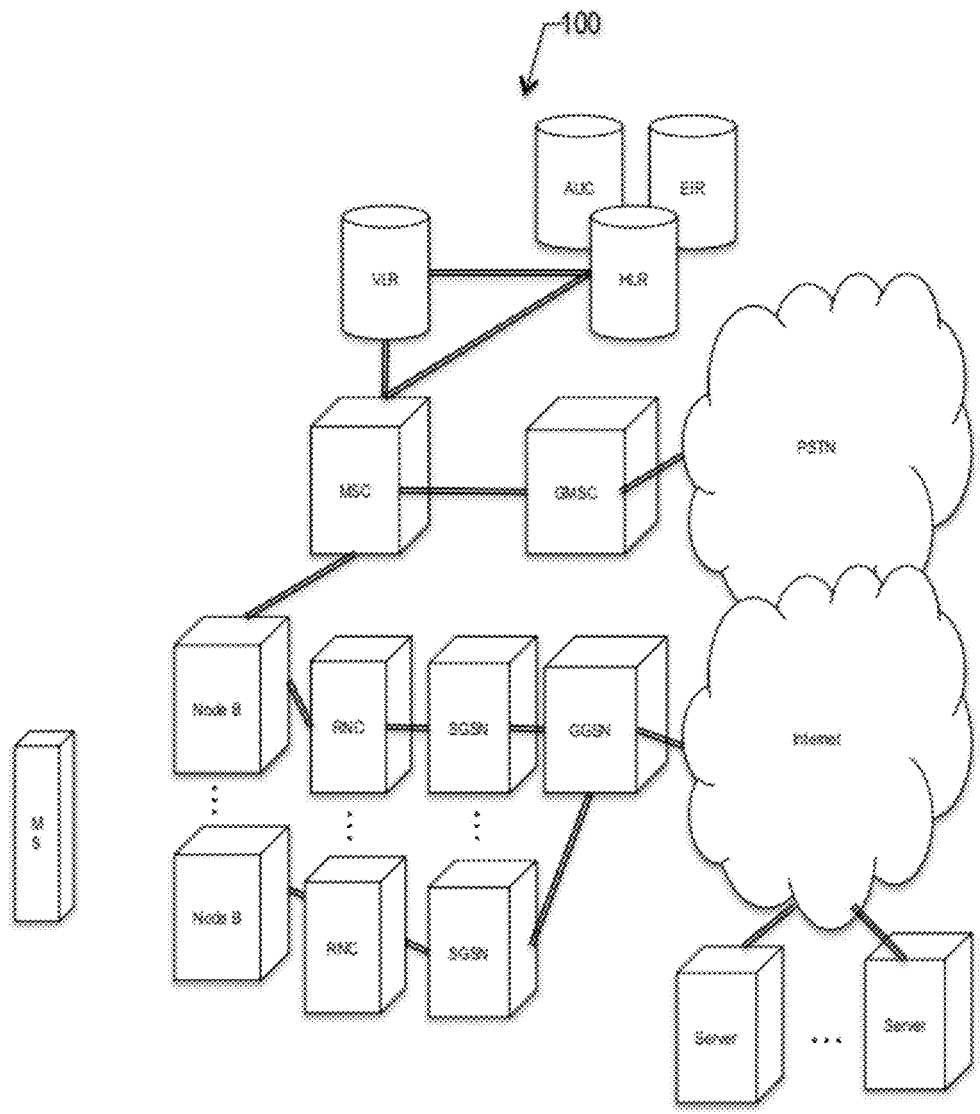
Fig 1: Mobile/Cellular Network Architecture (Prior Art)

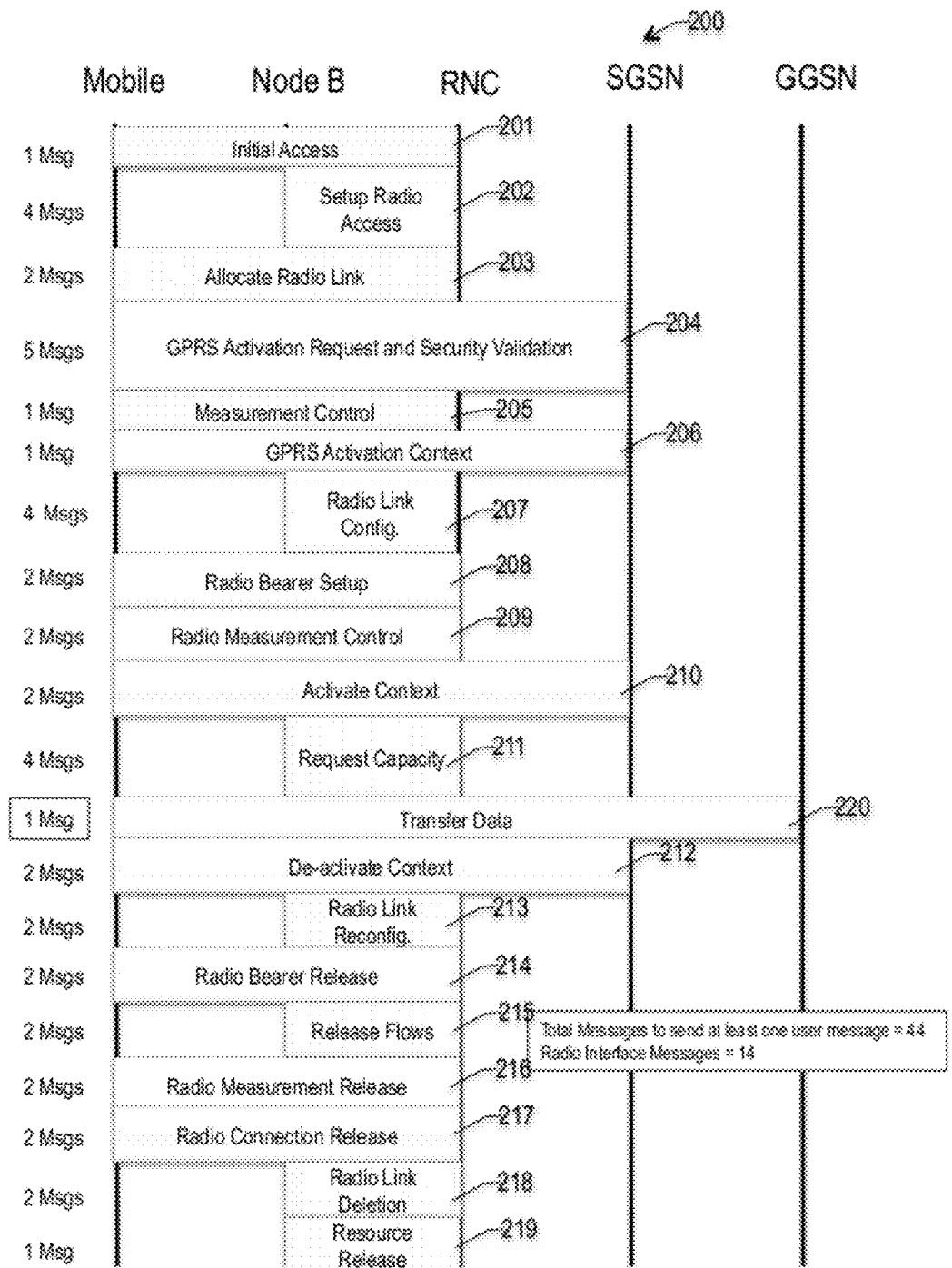
Fig 2: Mobile Network Signaling Messages (Prior Art)

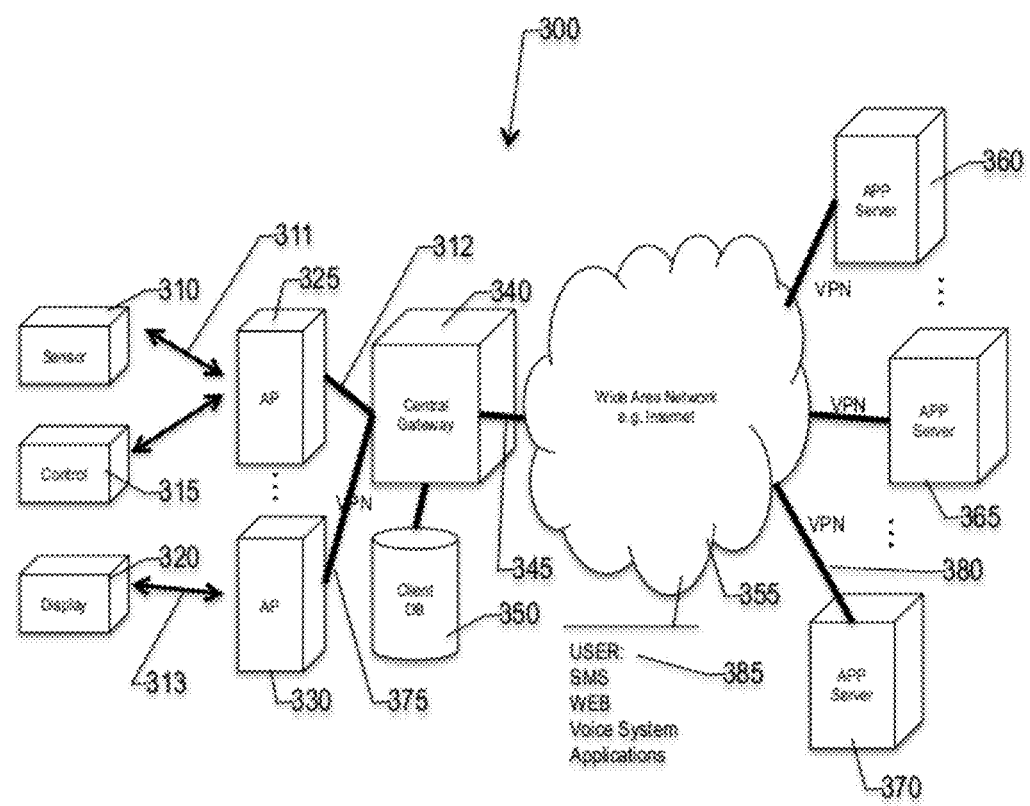
Fig 3: Low Signaling Rate Network Architecture

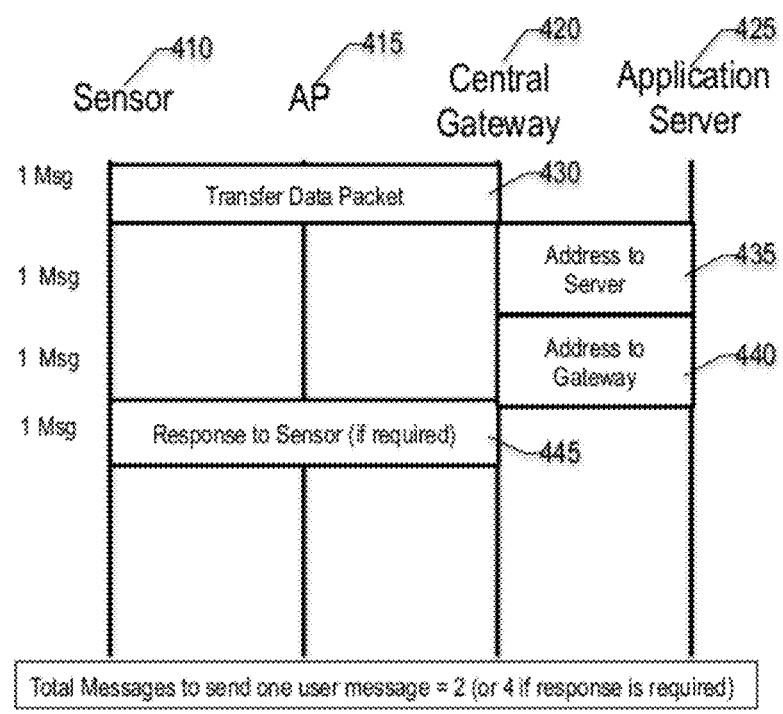
Fig 4: Generic Low Signaling Rate Network User Data Transfer

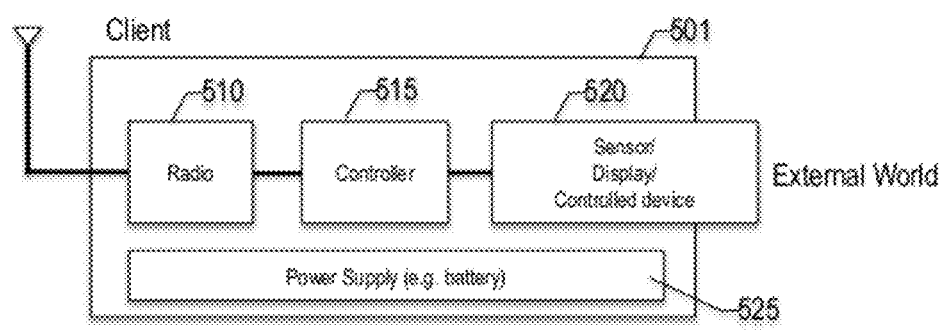
Fig 5: Example Client Architecture
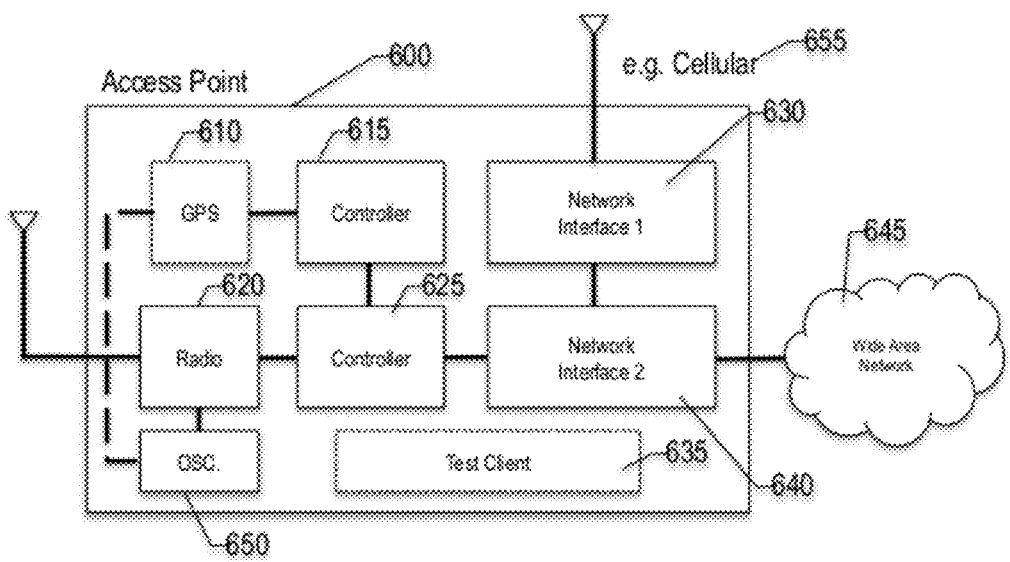
Fig 6: Typical Access Point Architecture

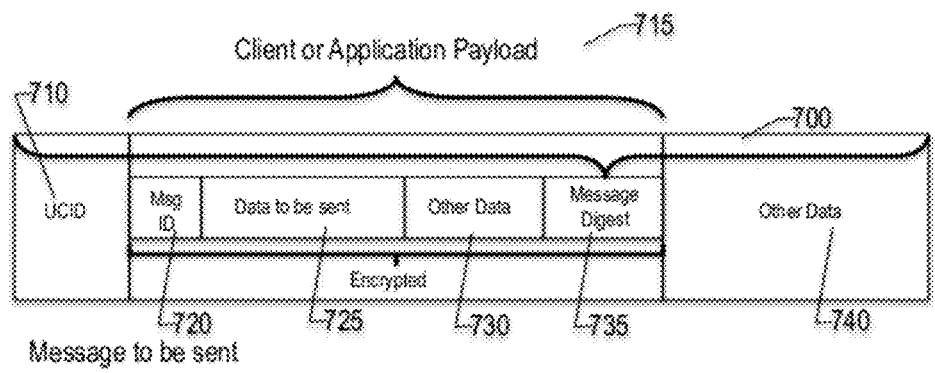
Fig 7: Typical Message format for Authentication Process
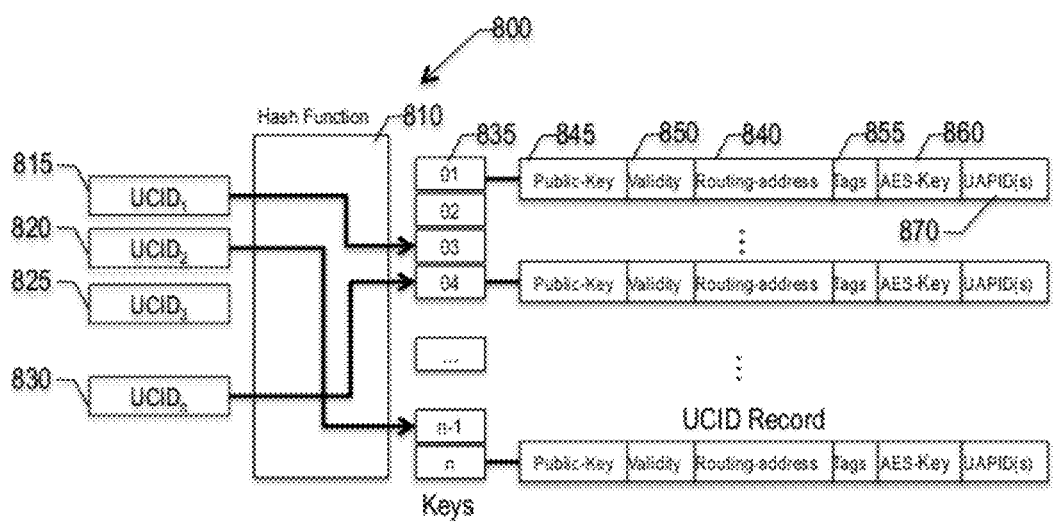
Fig 8: Example Client Database Hash Table

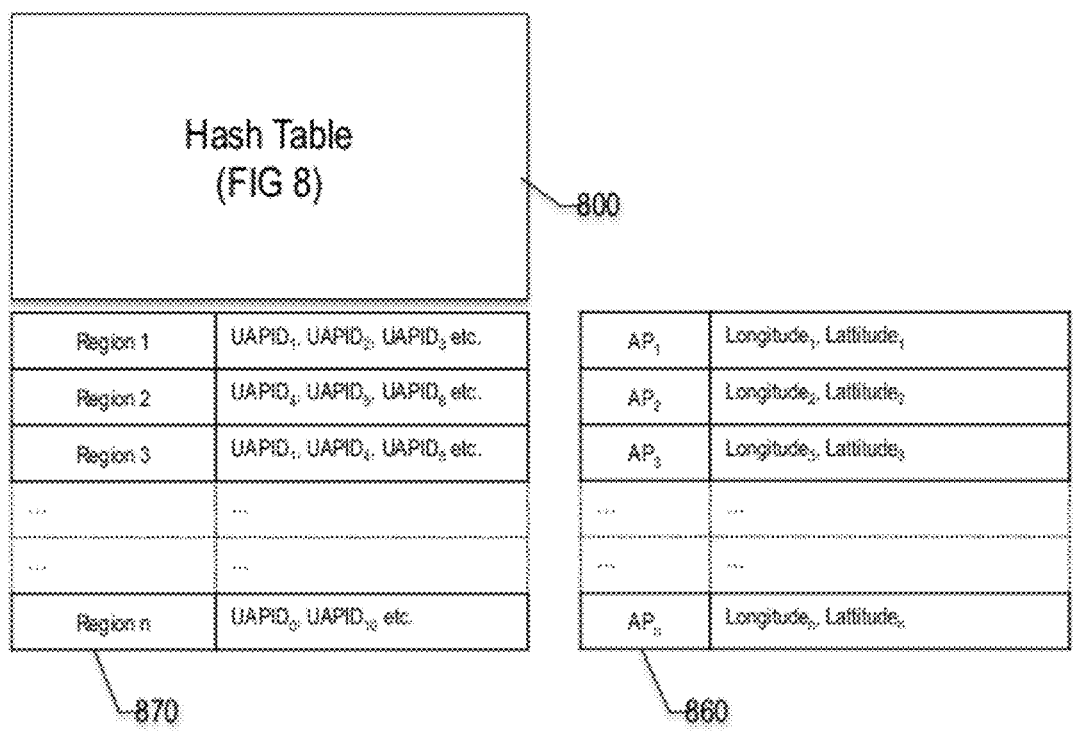
Fig 8a: Additional Central Gateway Databases

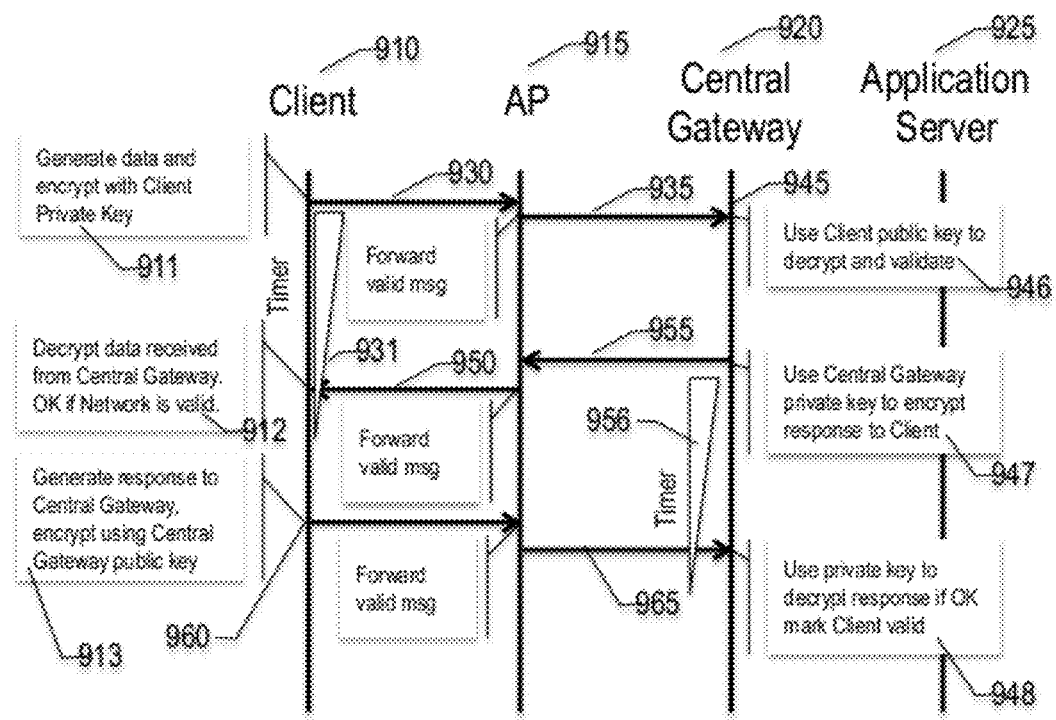
Fig 9: Mutual Authentication Flow

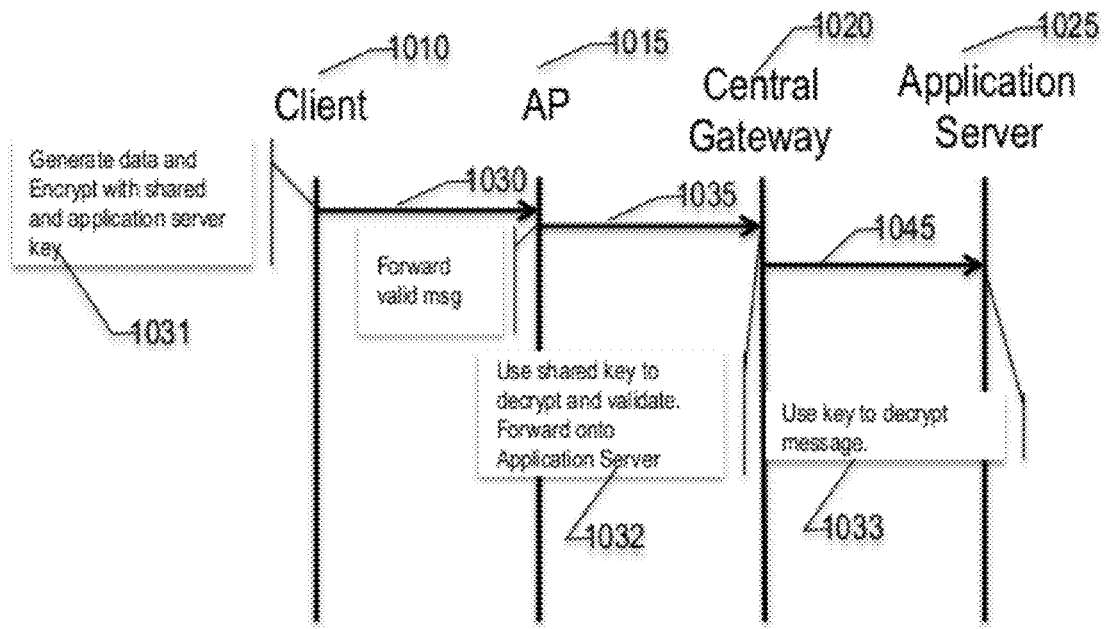
Fig 10: Client to Application Server Flow
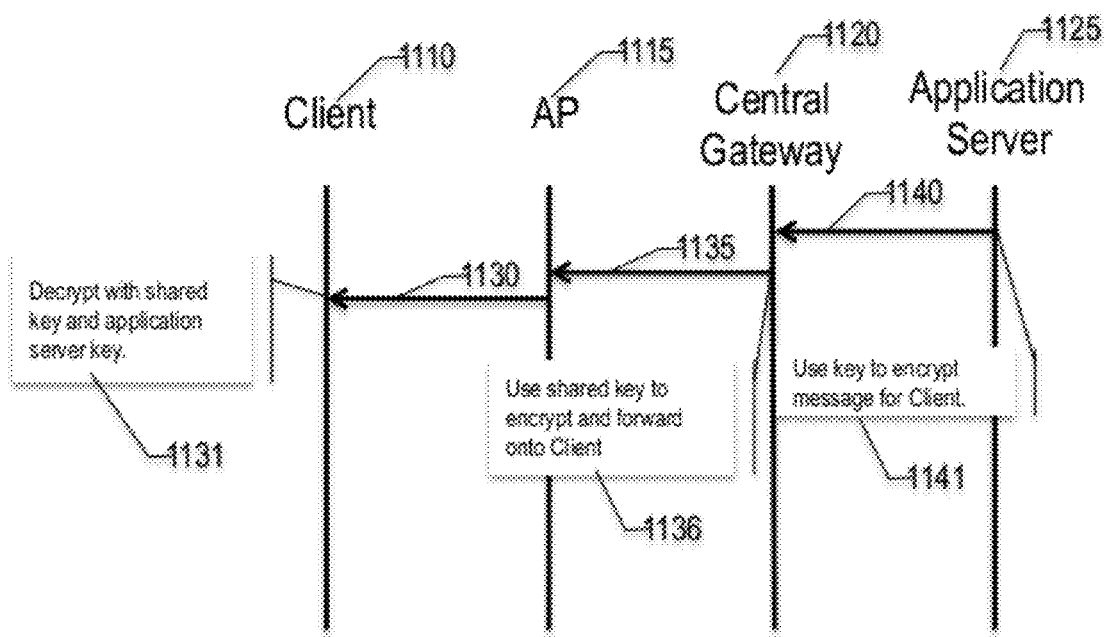
Fig 11: Application Server to Client Flow

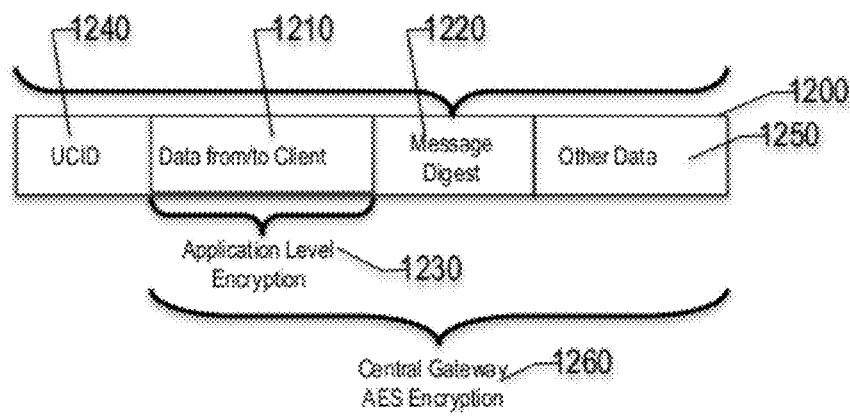
Fig 12: Typical Message Format for the Client or Application Server

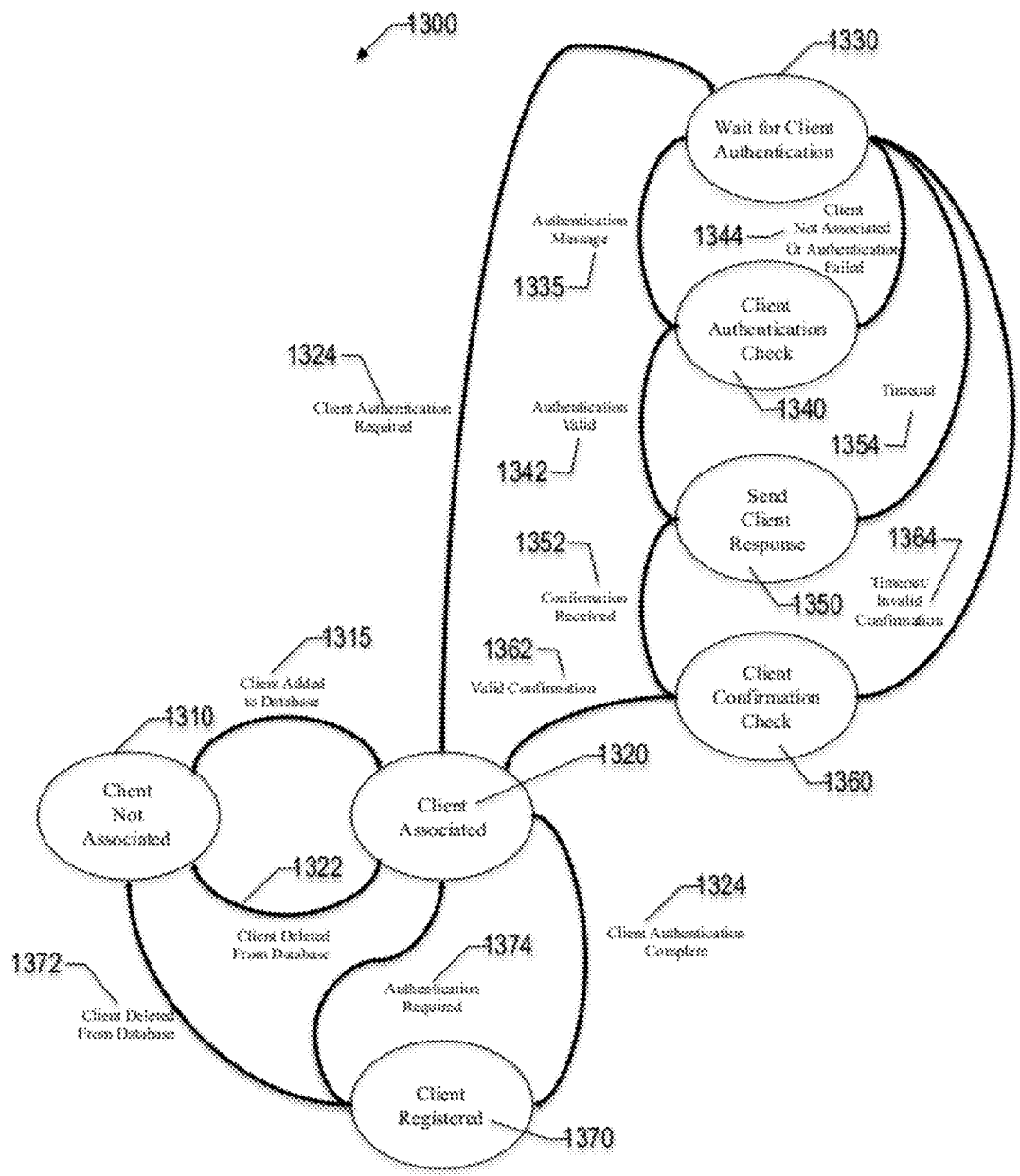
Fig 13: Example State Diagram for Client Database

METHOD AND APPARATUS FOR COMMUNICATING BETWEEN LOW MESSAGE RATE WIRELESS DEVICES AND USERS VIA MONITORING, CONTROL AND INFORMATION SYSTEMS

CROSS REFERENCE TO RELATED APPLICATIONS

This application claims priority to U.S. Provisional Application Ser. No. 61/499,391 filed on Jun. 21, 2011, entitled "Method and Apparatus for Communicating Between Low Message Rate Wireless Devices and Users via Monitoring, Control and Information Systems", which is hereby fully incorporated by reference.

BACKGROUND

The present invention relates to a method and apparatus that provides for communication between low message rate wireless devices and Users via monitoring, control and information systems.

To allow support for the growing number of mobile users and maintain consistent performance in terms of data speeds and access, all current mobile networks (FIG. 1) 100 have been designed to scale easily by adding more nodes (e.g., Node Bs, Mobile Switching Centers (MSCs), GPRS Serving Nodes (GGSN, SGSN), etc.) into the hierarchy. This network scalability comes with an associated signaling cost. To maintain control of this highly distributed and hierarchical network, and allow users virtually uninterrupted access, there needs to be a large volume of signaling messages (FIG. 2). The large signaling load is necessary to support: frequent authentication of users; changing locations of users within the network; setup of user connections, including reservation of network resources; release of user connections; maintenance of user connectivity to the network (i.e., handovers, power control). In this type of network architecture the signaling messages control every aspect of the users network access, including all the nodes associated with the user. Ideally, the signaling traffic is small in comparison to the overall user generated traffic; however for some types of network users and/or applications, the signaling traffic dominates over the payload traffic and can sometimes lead to signaling bandwidth becoming a chokepoint for the overall network operation. All cellular, paging and private mobile wireless networks use this hierarchical network design approach and can suffer from network problems related to signaling message overload.

Although it is technically possible to use the mobile wireless technology as described above to address many low user message rate machine-to-machine or machine-to-user applications, the associated costs are often prohibitive. A significant issue when using mobile networks (FIG. 1) 100 to serve these low user message rate applications is that there are many more signaling messages (FIG. 2) 200, 201-219 on the network than actual user data messages 220. In a typical mobile data network, more than 40 signaling messages are required to send a single payload message. While this signaling message overhead constitutes a small percentage of the total network traffic for applications such as streaming video (i.e., large volume of user/application generated messages) to a handset, for low message rate applications, there can be an order of magnitude more signaling traffic than actual payload message traffic. Even mobile devices that never send payload messages can result in substantial signaling message traffic by simply being connected to the network. In general, mobile wireless networks are optimized to deal with a moderate number of users or devices that each produce significant data message loads, rather than very large numbers of devices, each only occasionally sending or receiving a payload message. The invention described herein addresses the requirements for a network to efficiently support potentially billions of low user message rate devices.

A widely-deployed low user message rate application is remote utility meter reading (i.e., "Smart Meters"). It is a simple matter to design a low cost device that can capture meter usage data, however the more challenging part of the solution is the mechanism for delivering the data to a billing application located on the utility company servers. The current preferred approach often involves the installation of a private wireless network by the utility company to provide a link to the utility meter. The installation of the network itself can be very expensive and inefficient in terms of infrastructure utilization, as the wireless infrastructure is used to address only a single service application. Alternative implementations may use cellular data modems, however these can burden the solution with much higher device costs and recurring cellular service fees.

There are many applications that would benefit from the provision of a cost-effective low user message rate service. Virtually any device with a controller and/or information store may derive value from the addition of network connectivity. A sample list of applications that could benefit from low user message rate services is:

1. Utility Companies, as already mentioned
  Meter reading ("Smart Meter")
  Transmission/Distribution line monitoring and control ("Smart Grid")
2. Asset Tracking
  Vehicles
  Pets
  People
  Property
  Packages/retail goods
3. Health Services
  Patient vital signs
  Emergency contact services
  Validation of medicine use
4. Personal Fitness
  Exercise statistics
  Weight measurement
  Location and distances
5. Security
  Alarm monitoring
  Fire/flood detection
6. Home Automation
  HVAC control
  Energy use monitoring
  Lighting control
  Irrigation control
  Appliance control
7. Alarms
  Lock control
  Faults
  Automatic accident reporting
8. Information Display
  Time
  Weather station data
  Public transit
  Traffic conditions
  Parking locations 9. Public Safety
Traffic displays
Lighting control and monitoring
Flood monitoring
Weather/disaster alerts.

A common theme for all the listed low user message rate applications is that the transmission of the device payload by the network is not sensitive to network delays or jitter. This is in contrast to a voice or video application where delay or jitter in the sending of the voice/video data will result in poor perceived performance by the listener or viewer. Consequently voice/video applications are more suited to a mobile wireless network where the delay and jitter are tightly controlled (e.g., Cellular network).

In addition the number of messages sent by these exemplary low user message rate applications listed above may range, at one upper end, from for example ten's of messages per day in the case of a GPS based asset tracker application to hardly any messages for an alarm monitor (e.g., a storage shed window open sensor) that is rarely activated. This is again in contrast to a web browser or email application where delay/jitter (i.e., latency) are not important, but there may well be thousands of messages per day in order to deliver the users content. Although a high-message-rate cellular network could support low user message rate devices/applications, the previously discussed signaling message load might be excessive for such devices with very low utilization of the network resources. If this is scaled to support billions of devices, then the cellular network may become overloaded with signaling traffic.

In some cases the low user message rate network may need an initial registration dialog to configure the device, which will require each device to transmit a few messages.

The ability to provide low user message rate services at very low costs makes the introduction of these services an economically viable option, based on: low cost/complexity wireless transceivers, very low power utilization, and the economic benefits of sharing a common wireless infrastructure to serve a multiplicity of applications.

It is therefore apparent that an urgent need exists for a network architecture and communications apparatus and method to support the deployment of very large numbers of low user message rate devices that can cost effectively and efficiently support multiple machine-to-machine and machine-to-user interactions.

SUMMARY

To achieve the foregoing and in accordance with the present invention, systems and methods for communication between low message rate wireless devices and Users via monitoring, control and information systems.

It is the purpose of this invention to allow the use of low user message rate devices that can be cost effectively and efficiently deployed in their billions to support a wide range of applications that would be difficult to support using existing mobile wireless networks.

In one embodiment, the network uses a very low signaling rate and centrally controlled architecture in order to achieve this efficiency. The network can easily support numerous applications each controlling large numbers of devices. As the complexity of protocol used in the network is very much reduced in comparison to existing hierarchical mobile wireless networks, it is possible to produce devices that use very little energy allowing their use in many new and novel applications.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 1 shows a conventional cellular network;

FIG. 2 is a flowchart to show the method used in the network of FIG. 1, in contrast to that described herein;

FIG. 3 shows the network architecture and all the nodes associated with one embodiment of the invention;

FIG. 4 is a high level flow chart of the message flow in the network;

FIG. 5 is a block diagram of the Client device described herein;

FIG. 6 is a block diagram of the Access Point described herein;

FIG. 7 illustrates the structure and format of a typical authentication message as part of the invention;

FIG. 8 illustrates the structure of the hash table and database used in the Central Gateway;

FIG. 8a illustrates the location databases used by the Central Gateway;

FIG. 9 is a flow chart showing the message flow used in the mutual authentication employed by the network;

FIG. 10 is a flow chart showing the message flow from the Client node to the Application server;

FIG. 11 is a flow chart showing the message flow from the Application Server to the Client node;

FIG. 12 illustrates a typical client or application non-authentication message structure; and FIG. 13 is an example state diagram to show the states of a Client in the Central Gateway related databases.

DETAILED DESCRIPTION

The present invention relates to systems and methods providing communications between low message rate wireless devices and Users via monitoring, control and information systems.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

To facilitate discussion, FIG. 3 illustrates one embodiment of a low-message-rate communication system 300 includes network infrastructure components 325,330,340,350,355,360,365,370 and low-message-rate Clients 310,315,320. The network infrastructure includes Access Points (AP) 325,330, Central Gateway(s) 340, Client Databases 350, a public network (e.g., Internet) 355 and Application Servers 360,365,370. The Clients shown in FIG. 3 are represented by the sensor 310, controller 315 and display blocks 320; although these terms are generic, many other types of Clients could be envisioned by one skilled in the art. Clients link to the network infrastructure via a wireless connection 311,312,313. The wireless connection provides bidirectional transmission of data between the network infrastructure and Clients.

Network Overview

The new low signaling rate (LSR) network design uses an end-to-end data model wherein the network infrastructure is principally a conduit that allows the Client 310,315,320 and an Application Server 360,365,370 to communicate in a secure manner (FIG. 4) 430,435 or 440,445. The Client 310, 315,320 can perform one or a plurality of functions. The Application Server 360,365,370 controls each of the functions to provide a service to the end user of the device. The end user can access 385 the services via, for example, Short Message Service (SMS), web browser, computer/smartphone application or even a voice recognition system. In other aspects of the invention, the control may be totally independent based upon user-preset parameters or the Application Server 360,365,370 may not be involved in the interactions.

Within the network, Clients are located at the periphery of the network. Each Client (FIG. 5) 501 includes a radio interface 510 and a microcontroller for the radio 515. The microcontroller 515 may have a dual role as both a radio controller and for client application support 520. The complexity of the controller will vary depending upon the functions to be performed. Combining the control functions in such a way reduces the cost and overall size of the device. Combining functions may also help in reducing overall power consumption a benefit for battery-operated devices. The device may be powered by a battery 525 or other means (e.g., energy harvesting techniques).

There are several types of Client that could exist within the network:
1. Transmit and receive payloads (unicast and/or multicast)
2. Transmit payload only
3. Receive payload only (unicast and/or multicast)

The type of client to be deployed depends on the user application to be supported.

In order to identify Clients 310,315,320 within the LSR network, each unit is allocated at least one Client ID (CID). The CID could be, for example, a network unique identifier, IPv4 address, IPv6 address or other identifier that could be used to route a message. There are several different ways that CIDs could be assigned, depending upon the function performed by the Client 310,315,320:

Clients that can transmit data to the network or that receive unicast data (i.e., data addressed solely to the client) are assigned at least one unique Client ID (UCID). The format of a unique Client ID (UCID) is such that it provides sufficient identifiers for the entire life of the network without repetition. The allocation method for UCIDs is not critical, so long as no UCID is ever reused within the network for Clients capable of transmitting data.

For some applications it is desirable to transmit data to a plurality of Clients, as a multicast or broadcast transmission. In this case, a common CID shall be assigned to all of the Clients forming the multicast group, allowing all Clients to receive the same message when transmitted wirelessly by an AP 325,330. Clients that are associated with more than one service may be assigned multiple CIDs, to facilitate communication between the services and multiple Application Servers 360,365,370, or between multiple services provisioned within a single Application Server 360 or 365 or 370.

The Clients are divided into three main categories, although other classifications could be envisioned:
1. Sensors 310 are used to acquire data from physical environmental stimuli. Sensors 310 could, for example, include monitoring or measurement of temperature, humidity, wind direction and velocity, UV radiation, rainfall, voltages, position and motion. In this case, the data received from the sensor 520 is encoded into digital form before being wirelessly transmitted 510 to the network infrastructure. Transmission events may be triggered at specific times, time intervals, set data values, changes in data values, or by the receipt of a request from a Application Server 360,365,370 or user 385 to transmit the sensor data. Application Servers 360,365,370 may also choose to send acknowledgements for the receipt of a data transmission back to a Client 310, 315, 320, the receipt, or non-receipt, of which may also trigger future transmission events. In the case of sensor data, only one message may be sent to the network, which means that network jitter is unimportant. Even if multiple messages need to be sent by the sensor, then there arrival time is not critical. Also some network delay or latency can be tolerated (e.g., less that a few seconds), in sending the data to the network.

2. Controllers 315 generally regulate items such as lights, water sprinklers, heating boilers, thermostat settings and appliances. They may also provide feedback to an Application Server 360,365,370 on the results of the control request. The data to be sent may be encoded in digital form and then transmitted from an Application Server 360,365,370 over the network infrastructure to the Client 310,315,320 via the wireless interface. The Client may then respond with a success, failure or status message about the requested operation to an Application Server 360,365,370. In the case of control data, only one message may need to be sent from the network. The delays/latency for sending the message should be minimized but are not sensitive to any network delays.

3. Information displays 320 include the presentation of safety messages, traffic information, public transit status, weather information, product service notices, or other data. The information to be displayed is encoded in digital form by an Application Server 360,365,370 before being wirelessly transmitted to the Client(s) 320 through the network infrastructure. In the case of information display data, only one message may need to be sent from the network. However in some cases, multiple messages may need to be sent if the text to be displayed is long. The display will be responsible for the correct ordering of the messages.

Other combinations of Clients 310,315,320 could also be designed which overlap two or more categories. For example, GPS tracking devices may be embedded into cars, busses or packages to provide location data via the LSR network; this data could then in turn trigger controller actions (e.g., sounding a vehicle alarm) based on user interactions or when certain preset parameters are met.

In order to provide mutual authentication of the Client 310,315,320 and Network 340 and to possibly encipher the messages flowing between the Client 310,315,320 and Central Gateway 340, each Client 310,315,320 may be assigned a unique public/private key pair to be used in conjunction with any of the well-known public-key cryptography methods. The Client 310,315,320 is also provided with the public key of the Central Gateway 340. In the preferred embodiment, the unique private key for the Client 310,315,320 and Central Gateway 340 public key may be assigned and stored in the Client 310,315,320 hardware during manufacturing. The databases used by the Central Gateway 350 shall be loaded with the UCID and public key of each Client 310,315,320 that is allowed access to the network. If the UCID is not in the database, then the Client will no be able to use the network as the authentication process will fail. In addition, the Client 310,315,320 may be provided with other public keys to decrypt other data, for example, multicast information. Furthermore, the Client 310,315,320 may use other algorithms such as the Advanced Encryption Standard (AES) to en/decrypt data using a shared key method. Although the preferred embodiment is described here, one skilled in the art could envision other authentication and ciphering options.

The Access Point (AP) (FIG. 6) 325,330,600 contains a radio interface 620, one or more microcontrollers 615,625 and one or more interfaces to backhaul networks 630,640. Each AP 600 is assigned a unique AP identifier (UAPID). The UAPID could be, for example, a network unique identifier, IPv4 address, IPv6 address or other identifier that could be used to route a message to and from the AP 325,330. The type of address assigned to the AP 325,330 is a network-specific option.

The AP 325,330 is generally mounted high in a public area, for example, on a light pole, utility pole, side and/or top of a structure, cable strand or in any area that can provide good coverage of the surrounding environment. The AP 325,330 could also be mounted in shopping malls or campus environments to provide more localized network coverage. The AP 325,330 might be mounted indoors to provide coverage in, for example, high-rise buildings or other possibly hard to reach areas. The AP 325,330 mounting position is not restricted and could be anywhere that coverage is required.

The AP 325,330 may optionally contain a GPS 610 receiver to provide location data, aid Client 310,315,320 devices with associated GPS receivers in GPS signal acquisition, and/or aid in maintaining or improving the accuracy of the AP's 325,330 onboard oscillator 650, that may be used to set the radio frequency.

In addition, as an option the AP 325,330 may have a test Client 635 built into the enclosure to provide verification that the AP 325,330 is working correctly. The Client 635 may be used to monitor or otherwise check the performance of the radio within the AP 325,330.

The AP 325,330 collects the payload traffic from multiple Clients 310,315,320, forwarding the data onto the backhaul network(s) 375,655,645. The AP 325,330 in its basic form functions as a relay point for encoded payloads arriving from, or being sent to, the Clients 310,315,320.

The AP 325,330 may also control when and which Clients 310,315,320 may access the wireless network. Controlling access to the network is a critical aspect of the AP 325,330 function, as it prevents overloading of the shared wireless medium and allows all Clients 310,315,320 adequate access to the network. The traffic control can also be used in situations where there is a flood of access requests from a plurality of Clients 310,315,320, for example in a power outage situation when many Clients 310,315,320 may be provisioned to report power failure events.

The AP 325,330 backhaul network could be copper based (e.g., Cable Modem, DSL Modem) 640, wireless based (e.g., cellular, point-to-point, mesh or satellite modem) 630 or provide other means to connect the AP 325,330 to the remainder of the fixed part of network. One or more connection types could be provided to offer redundant links to the Central Gateway 340. The backhaul link(s) to the Central Gateway 340 may be via a secure VPN connection 375 to prevent tampering with, or interception of, the user data sent from the AP 325,330 over third-party links.

The AP 325,330 may be responsible for correcting transmission errors from the Clients 310,315,320. This could be in the form of forward error correction (FEC), automatic repeat request (ARQ) or other means suitable for the transmission medium and desired quality of service (QOS).

The Central Gateway 340 that is connected to the APs 325,330 performs the network routing functions for all the Clients 310,315,320 or application-generated messages within the network. The Central Gateway 340 may be connected to multiple APs 325,330 via a VPN 375 to provide both security and network independence. In addition, the Central Gateway 340 connects to multiple Application Servers 360,365,370 via VPN 380 links.

The Central Gateway 340 shall be secured within the network to prevent theft of authentication keys, ciphering keys or other sensitive data. There is logically only one Central Gateway 340 function within each network; however physically there may be more than one gateway, possibly located in different geographic locations to provide redundancy in case of failures and/or load balancing at times of excessive message traffic. The Central Gateway 340 is an essential component of the network and must maintain a high level of availability.

It should be clear to one skilled in the art that multiple independent LSR networks could cover the same geographic area and provide similar services. Additionally, they may have separate Central Gateways 340. It could also be the case that one of these networks is a private network covering, for example, a campus or shopping mall. In this case, the network may have an independent Central Gateway 340 or share a Central Gateway 340 with a local network to provide seamless coverage to their users 385.

The Central Gateway 340 contains a database(s) 350 (FIG. 8) that among other functions maps, via a hash function 810, the UCID 815,820,825,830 of each Client 310,315,320 onto an Application Server 360,365,370 or other address 840; this could be an IPv4 address, IPv6 address, URI, URL, CID, UCID, UAPID or any other address type suitable for routing the data to a destination. Multiple addresses may be associated with the CID depending on the requirements of the particular application. The mapping of addresses between Client 310,315,320 identifiers and Application Servers 360,365,370 or other address may be achieved using a hash table lookup (FIG. 6). The UCID related data is supplied by the application provider. If a Client address (e.g., UCID) exists within the database, then the Client 310,315,320 is considered associated 1320 with the network, it is then allowed to access the Application Servers 360,365,370 upon successful authentication 1370 (FIG. 13). If there is no UCID entry, the Client 310,315,320 is not permitted to use the network and may be ignored or rejected when it makes an access attempt.

Although the Central Gateway 340 is primarily responsible for address translation and routing, it may also perform a number of other roles; in some embodiments these may include:

Billing Data Collection: As part of the network service, the Central Gateway 340 may collect and generate Call Detail Records (CDRs) related to the message traffic flowing from each Client 310,315,320 that is, for example, tagged 855 in the database as a fee based service. For example, tracking services were the users 385 of the service pay additional fees for tracking packages, vehicles or other equipment may use this feature.

Encryption/Decryption/Authentication: If required, the Central Gateway 340 can en/decrypt messages to/from the Clients 310,315,320. This encryption may be in addition to any encryption performed between the Application Server 360,365,370 and Client 310,315,320. In the preferred embodiment, the ciphering process is performed using one of the many well-known public-key cryptography or AES schemes. The Central Gateway 340 has its own private key and the public keys 845 for all the Clients 310,315,320 that have been entered into the Central Gateway database 350. The public keys 845 may be associated with the CIDs in the hash table for easy access 800. As part of the authentication process, the data may also be used to mutually authenticate the Client 310,315,320 and the Central Gateway 340.

Traffic Policing: In cases when the flow of data to/from a specific Client 310,315,320 exceeds a service level agreement or available network capacity, the Central Gateway 340 may control the flow of data to/from the Client 310,315,320.

Location Database: As part of the services offered by the Central Gateway 340, it may also maintain a database (FIG. 8a) 870 that relates UAPIDs with specific regions or locations. These regions could group together APs 325,330 serving cities, counties, states, countries or other geographic classifications. The Application Server 360,365,370 may then request that certain application generated messages are sent to specific regions without requiring any direct knowledge of the network configuration and, in particular, the location of APs. The Central Gateway 340 could then use the location database 870 to identify a list of one or more destination APs. The application message would then be forwarded to APs on the list. In the case of co-hosted private networks, the Central Gateway 340 may exclude or include private APs dependent upon the particular application requirements. Another database 860 may also contain a record of the longitude and latitude of each AP 325,330 for tracking and maintenance purposes.

The Application Server 308, 212, 213 may be an integral part of the network when it is operated by the LSR network provider, for example, a time service provided to a plurality of Clients 310,315,320 located throughout the network. Or, the Application Server 360,365,370 may be operated by a third-party that uses the LSR network to offer services to an associated set of Clients 310,315,320. The network is designed for secure use by multiple parties and not generally restricted to one provider of application services. A service agreement with the network operator may be required for use of the network.

The Application Servers 360,365,370 communicate with their associated Clients 310,315,320 via the Central Gateway 340. As indicated above, the Central Gateway 340 maintains the links between Clients 310,315,320 and their Application Servers 360,365,370 (FIGS. 8 & 8a). The connections between the Application Servers 360,365,370 and Central Gateway 340 use secure VPN links 380. The security on this link may also be such that only certain types of messages are allowed on the link, all other types being dropped. This would help prevent malware or a virus on the Application Server 360,365,370 from harming the LSR network.

The Application Server 360,365,370 acts as the data collection, device control center, and/or information store for its associated Clients 310,315,320. The Application Server 360,365,370 may then link to other information feeds that, for example, allow users 385 to interact with the Clients 310,315,320 via the web, SMS, computer/smartphone applications or voice recognition systems. The Application Server 360,365,370 may perform control of other associated Clients 310,315,320 or devices based upon information received from one or more Clients 310,315,320.

Network Operation

The present invention primarily relates to minimizing or eliminating, network signaling overhead for low user message rate applications. Current mobile wireless networks use extensive signaling messages to control their associated devices (FIG. 2). For example, in some network designs in order to interact with the fixed network, the mobile device needs to send and receive a number of signaling messages (>40) 201-211 to reach a state where it can send the user message 220. There may also be signaling messages 212-219 required after the user message has been sent to return the mobile device to an idle or low power utilization condition. Additional signaling messages may be needed to frequently authenticate the user or track the user as they move around the network. The connection between the network and user is not persistent and requires frequent refreshes using signaling messages.

The radio hardware is a significant energy drain for many mobile devices when it is in use for transmitting and/or receiving messages. Additionally, since numerous signaling messages may be received/transmitted during the course of any interaction, the control processor in the device may be very complex in order to deal with all the states that might need to be addressed. Again, controller complexity often results in high power utilization. The signaling message overhead clearly requires significant power utilization in order to transmit a single user message 220. The ratio in this example (FIG. 2) would be 40:1, which is very inefficient when only a single data message is required. Indeed much work has been undertaken to optimize the signaling message requirements such that mobile devices can be returned to their lower-power idle state as quickly as possible. However, even with this work, the power utilization on the mobile device still typically represents a significant battery drain.

The minimization of signaling message overhead in this invention reduces the energy used by the radio hardware as it only has to deal with a few, if any, signaling messages to send a single payload message (FIG. 4). Similarly the complexity of the controller can be very low, as it does not have to deal with many signaling messages or keep track of numerous states. In addition, because the control of the network is centralized in the Central Gateway, there is no requirement for signaling messages to control the hierarchical nodes as used in the prior art networks. Both features mean that the Clients 310,315,320 can be very low power, small and have a simple (and low-cost) design. It also means that any device, once it has registered with the network, can maintain a persistent connection without the need for any further signaling interaction with the network, except under failure or restart conditions.

The operation of the network is now described below. Although the preferred embodiment is outlined herein, one skilled in the art could envision many other options.

The radio 620 in the AP 325,330 employs a wireless transceiver that is able to communicate in a frame-based manner using the known contention-based slotted ALOHA scheme. The AP 325,330 transceiver may employ Frequency Division Duplex (FDD) or Time Division Duplex (TDD), depending upon spectrum availability and licensing considerations.

The Client 310,315,320 employs Time Division Duplex (TDD). As those skilled in the art are aware, the use of a TDD scheme eliminates the need for expensive filters, diplexers and can result in the sharing of transmit and receive path hardware/software systems, etc. These features simplify the design and reduce cost significantly, both very important considerations for a Client 310,315,320.

As part of the frame structure, the AP 325,330 may broadcast signaling/control information relating to the identity of the AP 325,330, transmitted power level, cell delay for a Client 310,315,320 to access the network (Client 310,315, 320 access control), synchronization information, location information (e.g., GPS information), network identity and/or other control information. In the preferred embodiment this broadcast signaling/control information is transmitted in clear text, although it may be encoded to reduce the number of bits transmitted. In other embodiments, the broadcast information may be encrypted. It should be noted that clients 310,315,320 are not controlled individually, but rather the entire Client 310,315,320 population makes use of the broadcast signaling/control information to regulate their behavior.

The Client 310,315,320 may periodically monitor the broadcast signaling/control information, or it may only monitor this information prior to transmitting a Client 310,315,320 generated message. Regardless, if a Client 310,315,320 needs to transmit a message, it shall monitor the AP 325,330 broadcast signaling/control information for a sufficient time to determine the transmission parameters, in particular the time to wait before transmitting, and to synchronize transmission timing and/or frequency to the AP 325,330. The time to wait before transmitting data is part of the broadcast signaling/control information. The Client is expected to randomly select a time around this wait period before attempting to transmit. Using this technique the AP 325,330 can easily control the traffic load on the wireless interface either increasing or decreasing the access rate depending upon real time network conditions. There is no need to individually control each Client 310,315,320 as with the prior art networks. The intention of this control technique is to maximize the utilization of the wireless link ALOHA slots.

If a Client 310,315,320 has not been allocated a frequency to monitor, either during manufacture or installation, it may need to scan a range of pre-set frequencies to determine the exact frequency of the network broadcast carrier(s). In the preferred embodiment the Client 310,315,320 will try to determine if the discovered carrier contains any recognized information, for example, network identity. In some cases, multiple networks belonging to independent networks may occupy the same geographic coverage area. Additional carriers may be identified in this manner and the best candidate may be selected based on, but not restricted to, for example, received signal strength, signal quality or distance if location information is available.

If a Client 310,315,320 with transmission capabilities has never accessed the network before, has undergone a reset or other restart condition or needs to reacquire specific Client 310,315,320 data, it may need to authenticate itself with the network and authenticate the network. This mutual authentication (FIG. 9) uses the public/private keys previously described. The public/private keys allow the Client 310,315, 320 to access the network and may also allow the secure provision of a shared key for use with a symmetric ciphering algorithm, such as AES. An independent AES algorithm may be used to en/decrypt other Client 310,315,320 or application message transmissions.

Once the mutual authentication of the Client 310,315,320 and network is complete, the Client 310,315,320 is then registered 1370 (FIG. 13) on the network 300 and no further action needs to be taken by any entity prior to the commencement of payload message flows to/from the Client 310,315, 320; in effect, the connection persists without the need for any additional signaling messages, a key difference from prior art networks. The steps outlined below use the preferred embodiment, but one skilled in the art could envision other schemes that provide mutual authentication:

1. The Client 310,315,320 generates an authentication message containing at least the following information: message identifier, Random Number (RAND#) and message digest. The message (FIG. 7 shows the complete message structure) 715 may also include a timestamp and/or other data as required by the network 730. The message digest 735 may be computed over all this data as clear text and any other data that will be part of the message 710,740, for example data that maybe sent outside of the encrypted section. The message identifier 720 may be used as a counter or to identify the message contents, if multiple different types of message could be sent, for example, an initial access message or re-authentication required. Regardless of the message structure used, none of the data in the encrypted part of the message shall be repeated in clear text in any other parts of the message.

2. The message generated in step 1 is encrypted with the pre-stored Client 310,315,320 private key. This key is unique and only known to the Client 310,315,320. This process will generate an encrypted payload 715. For security reasons the private key maybe hardcoded/embedded into the silicon running the authentication algorithms.

3. The Client UCID 710 is now prepended to the encrypted payload. Other data 740 may be added to the clear text part of this new message 700 as required.

4. The message (clear text 710,740 and encrypted payload 715) is now queued for transmission 911. The Client 310,315, 320 will, after monitoring the broadcast signaling/control information of nearby APs as described above, select the best candidate and synchronize with the transmission of that AP. The message will then be transmitted wirelessly to the network 930 via the radio 510 interfaces.

5. The Client 310,315,320 will now turn off the transmitter 510, enter a listen mode and wait for a response from the network 300. The wait time may be preset 931 so that the Client 310,315,320 times out if no response received. The Client 310,315,320 may take actions to repeat the authentication message or perform other functions associated with a possibly lost response.

6. Upon receipt of a valid Client 310,315,320 authentication message 930, the AP 325,330 shall forward the complete message 935, 1335 to the Central Gateway 340 via a secure VPN link 375. The determination of validity may be based upon the results of the demodulation process or other checks on the message such as CRCs or FEC.

7. Using the clear text UCID 710 from the Client 310,315, 320 message 700, the Central Gateway 340 shall retrieve the Client's 310,315,320 public key 845 from the Client database 800. The encrypted part of the message 715 shall then be decrypted. If the decryption is successful (success will depend on the method used), then the Central Gateway 340 shall compute a message digest. If the received message digest 735 and newly computed digest match, then the message shall be considered valid and the Client 310,315,320 has then been authenticated with the Central Gateway 340/network 300. The Central Gateway 340 may check the clear text as an additional validation mechanism. If any of these steps fail, the whole message shall be considered invalid and discarded 1344. Each failed attempt will be counted and if a maximum number of authentication attempts (set by the network) has been reached, the UCID maybe tagged as invalid 850. A successful authentication will reset the count. If the UCID is not present in the database, then the Client 310,315, 320 is not associated 1310 with the network. In this case, the message shall be ignored and not processed further, although a log message of the failure may be generated for security purposes.

8. If the authentication message is successfully received 1342, the Central Gateway 340 shall now generate a response message 947, 1360 to the Client 310,315,320. The response message shall include: the transmitted random number (RAND#) and any other data to be provided to the Client 310,315,320, for example configuration data or a shared key to be used by the AES algorithm in the Client 310,315,320. A message digest shall be computed using all the data and possibly other data to be transmitted in clear text outside of the encrypted message. The message shall be encrypted using the Central Gateways 340 private key. The assigned AES shared key shall be stored against the UCID entry 835 in the Client database 800. Upon sending the message, the Central Gateway 340 shall start a timer 956.

9. The encrypted part of the response message shall be prepended with the received UCID 710 and sent to the AP 325,330 955 for transmission 950 to the Client 310,315,320.

10. Upon receipt of the response message, the AP 325,330 shall transmit the data to the Client 310,315,320 at the earliest opportunity.

11. When the Client 310,315,320 receives the response 912, it shall stop any associated timer 931 and attempt to decode the message with the pre-shared public key of the Central Gateway 340. After successfully decrypting the message, the Client 310,315,320 will check that the message digest 735 is valid and that the random number returned is the same as RAND# generated in step 1. Other checks may be performed on the message to validate the contents. If the message is valid, then the Client 310,315,320 will have authenticated the network and the supplied (if present) AES shared key shall be stored for future use. If any validation steps fail, then the whole authentication process shall be deemed to have failed. Before marking the network as invalid, the process may be repeated by the Client 310,315,320 a pre-set number of times.

12. Once the received response message has been validated 912, the Client 310,315,320 shall compose an acknowledgement message 913 to the Central Gateway 340. The message shall include the UCID and any other data as required. The computed message digest may include all this data and any other data that will be part of the message, for example data that maybe sent outside of the encrypted message. The message shall then be encrypted using the Central Gateways 340 public key.

13. The acknowledgement message shall be transmitted 960 wirelessly to the AP 325,330 and onto the Central Gateway 340,965,1352 as previously described above. The Central Gateway 340, upon receiving the acknowledgement message 948, shall stop the associated timer 956 and decrypt the message using its own private key. If the decrypt process is successful and the contents are valid, the digest is correct and any other requested data can be validated, then the authentication process is complete 948. The Client 310,315,320 shall now be marked as registered 850,1320,1370 by the Central Gateway 340. If any step of mutual authentication fails, including expiry of the timer 956, then the whole process shall be considered void. The Client 310,315,320 may repeat the process after a preset time.

In the three messages described 911, 947, 973 above, the Client 310,315,320 and/or AP 325,330 may add FEC bits as required without impacting the mutual authentication process.

Due to the potential size of the whole authentication message, the complete process may require several transmissions from the Client 310,315,320 and Central Gateway 340.

In order to facilitate a timely response to the Client 310, 315,320 when waiting for an acknowledgement, as described above, or other response, the network capacity may be allocated such that it shall be capable of relaying the response to the Client 310,315,320 within a well-defined preset time. The preset time is known to the network entities and taken into consideration when developing the service.

It should be noted that the mutual authentication process as described above only involves the Client 310,315,320 and Central Gateway 340. Other schemes could be envisioned where the Client 310,315,320 may also want to authenticate the Application Server 360,365,370, and vice versa, before using the network. A similar mechanism could be used.

Once the mutual authentication process has completed successfully, for those Clients 310,315,320 that require authentication, the Client 310,315,320 may now enter the normal mode of operation. The mutual authentication process may, for some Clients 310,315,320, be a one-time-only message exchange. It is not required each time Client 310,315,320 messages are to be sent, as the network connection persists indefinitely. It therefore does not constitute a significant overheard relative to Client 310,315,320/application message transmission traffic levels.

The mutual authentication process may be used by some Clients 310,315,320, however other Clients 310,315,320 that may only transmit very infrequently, for example, a single payload message in their lifetime could use other methods, for example one-time ciphers based on a pre-stored table or a pre-shared AES key that was generated and stored in the device during manufacture.

In some cases the Client 310,315,320 may not use steps 12 and 13, instead it may immediately generate a payload and encrypt the data with the pre-shared AES key received in step 10. Upon receipt of the AES encrypted message from the Client 310,315,320, the Central Gateway 340 shall stop any timers running and decrypt the message. If the decryption is successful, then the Client 310,315,320 shall be considered valid and marked as registered in the database 1370. This process allows the Client 310,315,320 to omit a message sending step and provide useful data more quickly to the network and save energy (e.g., prolong battery life).

If a Client 310,315,320 has data to transmit to the Application Server 360,365,370 (FIG. 10), then it shall use the following steps. This is the preferred embodiment but other schemes could be envisioned by one skilled in the art:

1. The Client 310,315,320, 1010 generates a Client payload message (FIG. 12) containing the data to be transmitted 1210 to the network. The data may be the digital encoding of the output from a sensor or other information.

2. The message may now be encrypted 1230 using keys provided by the Application Server 360,365,370. The type and method of encryption used at this step would be determined by the application requirements.

3. The message, either in clear text or encrypted as outlined in the above step, may be further encrypted using the AES algorithm with the shared key obtained during the authentication process 1260. The encrypted message may contain a message digest 1220 that is computed over at least the encrypted message, but may include clear-text information outside the encrypted data.

4. The Client's 310,315,320 clear text UCID 1240 is prepended to the encrypted message. Other data may be added to the clear-text part of the message as required 1250. In no case shall this data be repeated inside the encrypted part of the message.

5. The complete message is now queued for transmission. The Client 310,315,320 shall, after monitoring the broadcast signaling/control information of nearby APs, select the best candidate and synchronize with the transmission of that AP. The message will then be transmitted wirelessly 1030 to the network via the radio interface 510.

6. The Client 310,315,320 shall now turn off the radio transmitter and may enter a listen mode if it is expecting a response from the network (e.g., Application Server 360,365, 370). The response procedure is described below (FIG. 11).

7. Upon receipt of a valid message, the AP 325,330 shall forward the complete message to the Central Gateway 340 via a secure VPN link 1035. The determination of validity may be based upon the results of the demodulation process or other checks on the message such as CRCs or FEC success/failure. In some embodiments the AP 325,330 may decrypt the received message using the AES shared key. This could also be used as a validation of the receive message. In this case the decrypted message would be forwarded onto the Central Gateway 340.

8. Using the UCID 1240, the Central Gateway 340 shall retrieve the AES shared key 860 and decrypt the received Client 310,315,320 message. If the decryption is successful, as determined by the algorithm, then the Central Gateway 340 shall compute a message digest. If the received message digest 1020 and newly computed digest match, then the message shall be considered valid. If any of these steps fail, the whole message shall be considered invalid and discarded. The Central Gateway 340 may also check the database 800 to see if the Client 310,315,320 has used the mutual authentication process. If the Client 310,315,320 is not authenticated or tagged as invalid 850, then the data may be considered unsound, however it may still forward the message 1045 to an Application Server 360,365,370.

9. Once the Central Gateway 340 has decided to forward the message, then it shall use the UCID 1240 to lookup a routing address from the database 840. The routing address shall then be used to route the message, including UCID towards the final destination 1045. The final destination may be an Application Server 360,365,370 or another Client 310, 315,320. The Central Gateway 340 shall also store the UAPID of the AP 325,330 that received the message. The Central Gateway 340 may have differing policies on storing of the UAPID(s) that are service dependent. For example, only the last AP 325,330 used by the Client 310,315,320 may be stored, several recent APs 325,330 may be stored, or all the APs 325,330 ever used by the Client 310,315,320 may be stored. Other storage policies are possible.

If the message from the Client 310,315,320 is not successfully received by the AP, for example a CRC checksum fails because the message was corrupted by a collision with a data message from another Client 310,315,320, then the message shall be discarded and no indication shall be forwarded to the Central Gateway 340.

For the transmission of a single Client 310,315,320 message to the Application Server 360,365,370, only one message need be sent on each of the links 1030, 1035, 1045: Client 310,315,320-AP, AP-Central Gateway 340 and Central Gateway 340—Application Server 360,365,370. No signaling messages tied to the transmission of the Client 310,315, 320 message are required. This is an extremely efficient use of the network resource to transmit a single message.

After receiving the Client 310,315,320 generated message 1031, the Application Server 360,365,370 shall decrypt the message (if it was encrypted) using information available at the server, for example the Application Server's 360,365,370 public key. The method used by the Application Server 360, 365,370 to decrypt/encrypt the message is determined by the requirements of the application. After successfully decrypting (if used) the message, the Application Server 360,365,370 may acknowledge the receipt of the data from the Client 310,315,320 and/or provide other response information (FIG. 11) to the Client 310,315,320. How the Application Server 360,365,370 processes the received message will depend upon the function of the Client 310,315,320 and is beyond the description provided here. If the application chooses to send a response, or other message, back to the Client 310,315,320, then the Application Server 360,365,370 generates the message content, encrypts as required, and includes the UCID provided with the original inbound Client 310,315,320 message. The whole packet is then forwarded to the Central Gateway 340 via a secure VPN link 380.

If the Application Server 360,365,370 fails to decrypt the Client 310,315,320 generated message correctly, then the information is discarded and no further action is taken, beyond perhaps logging the failure for network management considerations. The application may include hash fields or Client 310,315,320 and/or Server identity information within the encrypted message in order to verify the integrity of the decrypted message.

When the Central Gateway 340 receives a response message 1140 from an Application Server 360,365,370 then:

1. The Central Gateway 340 shall use the clear text UCID to retrieve the routing information, for example a UAPID 870 and the Clients 310,315,320 AES shared key 860. The Central Gateway 340 shall then encrypt the entire message using the Clients 310,315,320 AES shared key. A message digest may be added to the encrypted part of the message. The message digest may include the original message received from the Application Server 360,365,370 as well as any additional data (e.g., UCID) included with the message by the Central Gateway 340.

2. The encrypted part of the response message shall be prepended with the received clear text UCID and sent to the UAPID for transmission 1135 to the Client 310,315,320.

3. Upon receipt of the response message, the AP 325,330 shall transmit the message 1130 to the Client 310,315,320 in a timely manner, based on the data traffic policies in place at the time.

4. When the Client 310,315,320 receives the response 1131, it shall attempt to decrypt the message with its shared key or by other means. After successfully decrypting the message, the Client 310,315,320 shall check that the message digest is valid. Other checks may be performed on the message to validate the contents. If any validation steps fail, then the whole message may be discarded.

5. Once the received response message has been validated, the Client 310,315,320, if required, may decrypt the message from the Application Server 360,365,370 using pre-stored application specific keys or other means. After successfully decrypting the message, the Client 310,315,320 may then act upon the data received. If the process fails, then the entire message shall be discarded.

As with the mutual authentication case, in order to facilitate a timely response to the Client 310,315,320, the network capacity shall be allocated such that a response may be provided within a well-defined preset time. The preset time is known to the network entities and taken into consideration when developing the service.

For the transmission of the single message to the Client 310,315,320 from the Application Server 360,365,370, only one message need be sent on each of the links 1130, 1135, 1140: Application Server 360,365,370—Central Gateway 340, Central Gateway 340—AP 325,330 and AP-Client 310, 315,320. No signaling messages tied to the transmission of the message are required. This is an extremely efficient use of the network resource to transmit a single message to the Client 310,315,320.

In some instances the Client 310,315,320 may only have sufficient energy to transmit/receive a few messages. In this case the mutual authentication process need not be used. Instead the Client might be manufactured with a pre-shared key (e.g., AES key or one-time cipher key) in order to encrypt the data. However the UCID of the Client still needs to be associated with the Central Gateway, including the pre-shared key, for the successful reception of any payload sent to the network.

Another aspect of the current invention is the ability of the Application Server 360,365,370 to send messages to multiple Clients 310,315,320, independently of receiving messages from the Clients 310,315,320. In this case, the Application Server 360,365,370 shall provide the message to be transmitted and a CID to the Central Gateway 340, typically including a geographic region, or other means of specifying a network subset, where the message is to be broadcast. The network makes no determination of whether or not the targeted Clients 310,315,320 are in a receive mode; it is the responsibility of the application and its associated set of Clients 310,315,320 to ensure that the desired target Clients 310,315,320 are prepared to receive the message. Location, or other network subset, information provided with the message is used by the Central Gateway 340 to select an AP, or multiple APs, from its database 870, that provide coverage over the set of targeted Clients 310,315,320. The message is then forwarded to those APs, the CID being included as part of the message. Multiple Clients 310,315,320 may have the same CID, creating a multicast/broadcast transmission. In this case, the Application Server 360,365,370 and Central Gateway 340 encryption processes outlined above could be used in the transmission process with the use of common decryption keys.

The network also provides another option for message routing. In this particular embodiment, it is possible for Clients 310,315,320 to communicate with each other directly, without the need for an Application Server 360,365,370. In this case the Central Gateway 340 Client database 800 has an associated CID as the destination address 870, rather than a particular Application Server 360,365,370. Consequently, when a message is received for a Client 310,315,320 so registered by the Central Gateway 340, the message is then forwarded to the targeted CID. This allows some Clients 310,315,320 to communicate directly via the network. For example a temperature sensor may multicast the temperature reading to a number of weather display boards. In this case the Application Server 360,365,370 is not required.

As already outlined previously in some instances a network user may wish to have their own private LSR network to service their own Client 310,315,320 coverage area, for example, a campus or shopping mall. This option is possible using the methods outlined above. The private network could exist as part of the wider publicly used network and simply identified within the Central Gateway 340 as an independent area 870. The private network could permit public network users to use the private network or they could be barred. All these features could be controlled by a Central Gateway 340. Alternatively the network could be completely private using a separate Central Gateway 340.

Although the AP 325,330 outlined above has been assumed to be of one homogeneous type, the network is also capable of supporting smaller coverage and installation areas using smaller Pico or Femto Access Points. These could be used to provide a more local coverage area in regions that may have poor coverage from the main AP 325,330. The methods and locations for mounting the Pico/Femto cells would be as outlined for the normal AP 325,330.

The above paragraphs have outlined clearly how the LSR network may interact with the Clients 310,315,320 for both payload transmission and reception. As can be determined from the above description, in general, only one message is sent in order to transfer data between a Client 310,315,320 and an Application Server 360,365,370. There is no need to use any signaling messages to control the Client 310,315,320 or network 300. Therefore, it is clear from the network description that a schema has been demonstrated for very low user message rates without the need for any signaling messages to control the Clients 310,315,320.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized wide-area low-user-message-rate communication system for communicating with at least one low-user-message-rate client, the communication system comprising:
   a Network Concentrator configured to authenticate an at least one low-user-message-rate client;
   a client registry configured to persistently register the at least one low-user-message-rate client having a unique client ID;
   wherein the Network Concentrator maintains a persistent connection with the at least one low-user-message-rate client without any signaling interaction, unless a failure or restart condition occurs; and
   a low-user-message-rate concentration point configured to send a broadcast control message to the at least one low-user-message-rate client wherein the broadcast control message includes a range of permitted time intervals which are varied in response to a change in a communications channel utilization rate from the at least one client to the low-user-message-rate concentration point.

2. The low-user-message-rate communication system of claim 1 further comprising a low-user-message-rate concentration point and wherein the Network Concentrator is further configured to forward a low-user-message-rate client message from the at least one low-user-message-rate client to an application server.

3. The low-user-message-rate communication system of claim 1 wherein the Network Concentrator is a centralized Network Concentrator.

4. The low-user-message-rate communication system of claim 2 further comprising a low-user-message-rate concentration point and wherein the Network Concentrator is further configured to forward a low-user-message-rate application server message from an application server to the at least one low-user-message-rate client.

5. The low-user-message-rate communication of claim 1 further comprising a low-user-message rate concentration point, wherein the at least one low-user-message-rate client is authenticated via the low-user-message-rate concentration point.

6. The low-user-message-rate communication system of claim 1 wherein the client registry is associated with the Network Concentrator.

7. The low-user-message-rate communication system of claim 4 wherein the Network Concentrator communicates with the application server via a public wide area network.

8. The low-user-message-rate communication system of claim 4 wherein at least one of the client message and the application server message is encrypted.

9. The low-user-message-rate communication system of claim 1 wherein the broadcast control message instructs the at least one low-user-message-rate client to select a random transmission time interval within the varying range of permitted time intervals in response to a change in low-user-message-rate client collision rates.

10. The low-user-message rate communication system of claim 1 wherein the at least one low-user-message rate client is configured to authenticate the Network Concentrator.

11. In a computerized wide-area communication system having a Network Concentrator and at least one concentration point coupled to the Network Concentrator, the at least one concentration point configured to communicate with at least one client, a low-user-message-rate communication method comprising:
    authenticating an at least one low-user-message-rate client;
    persistently registering the at least one low-user-message-rate client having a unique client ID;
    maintaining a persistent connection with the at least one low-user-message-rate client without any signaling interaction, unless a failure or restart condition occurs; and
    sending a broadcast control message to the at least one low-user-message-rate client wherein the broadcast control message includes a range of permitted time intervals which are varied in response to a change in a communications channel utilization rate from the at least one client.

12. The low-user-message-rate method of claim 11 further comprising sending a low-user-message-rate client message from the at least one low-user-message-rate client to an application server via a low-user-message-rate concentration point and a Network Concentrator.

13. The low-user-message-rate method of claim 12 wherein the Network Concentrator is a centralized Network Concentrator.

14. The low-user-message-rate method of claim 12 further comprising receiving a low-user-message-rate application server message from the application server via a Network Concentrator and a low-user-message-rate concentration point.

15. The low-user-message-rate method of claim 11 wherein the at least one low-user-message-rate client is authenticated via a low-user-message-rate concentration point, and wherein the at least one low-user-message-rate client is persistently registered by a client registry associated with a Network Concentrator.

16. The low-user-message-rate method of claim 14 wherein the Network Concentrator communicates with the application server via a public wide area network.

17. The low-user-message-rate method of claim 14 wherein at least one of the client message and the application server message is encrypted.

18. The low-user-message-rate method of claim 11 wherein the broadcast control message instructs the at least one low-user-message-rate client to select a random transmission time interval within the varying range of permitted time intervals in response to a change in low-user-message-rate client collision rates.

19. The low-user-message rate method of claim 11 further comprising authenticating the Network Concentrator.

20. In a computerized wide-area communication system having a plurality of application servers, a centralized Network Concentrator, and a plurality of concentration points, each of the concentration points coupled to at least one client, a computerized low-user-message-rate method for communicating with a plurality of clients, each of the plurality of clients having a unique client ID, the method comprising:
    in the centralized Network Concentrator, sending a broadcast control message to a plurality of low-user-message-rate clients, wherein the broadcast control message includes a range of permitted time intervals which are varied in response to a change in a communications channel utilization rate from the plurality of low-user-message-rate clients to the centralized Network Concentrator;
    in one of the plurality of low-user-message-rate clients, sending an authentication message including a unique client ID and encrypted with a client private key to a centralized Network Concentrator at a random time within the range of permitted time intervals;
    in the centralized Network Concentrator, using a client public key to decrypt and validate the authentication message, and sending a Network Concentrator authentication response encrypted with a Network Concentrator private key to the one client;
    in the one client, using a Network Concentrator public key to decrypt and validate the Network Concentrator authentication response, and sending a client acknowledgement response encrypted with the Network Concentrator private key to the one client;
    in the centralized Network Concentrator, using the Network Concentrator private key to decrypt the client acknowledgement response;
    in a client registry persistently registering the one client having the unique client ID as valid; and
    in the Network Concentrator maintaining a persistent connection with the at least one low-user-message-rate client without any signaling interaction, unless a failure or restart condition occurs.

21. The computerized low-user-message-rate method of claim 20 further comprising:
    in the one client, sending an encrypted low-user-message-rate client message encrypted with a shared key and an application server key and destined for one of a plurality of application server;
    in the centralized Network Concentrator, validating the client message using the shared key and forwarding the client message to the one application server; and
    in the one application server, decrypting the client message using the application server key.

22. The computerized low-user-message-rate method of claim 20 further comprising:
    in one of a plurality of application servers, sending an encrypted application server message encrypted with the application server key destined for the one client;
    in the centralized Network Concentrator, further encrypting the application server message using a shared key and forwarding the application server message to the one client; and
    in the one client, decrypting the application server message using the shared key and the application server key.

* * * * *